United States Patent [19]

Engel

[11] 4,175,349

[45] Nov. 27, 1979

[54] FISH LURE

[76] Inventor: Derryl D. Engel, Box 1908, Leduc, Alberta, Canada

[21] Appl. No.: 920,732

[22] Filed: Jun. 30, 1978

[51] Int. Cl.² ............................................. A01K 85/04
[52] U.S. Cl. .................................. 43/42.02; 43/42.13; 43/42.5
[58] Field of Search .................... 43/42.02, 42.3, 42.5, 43/42.11, 42.13, 42.18, 42.05

[56] References Cited

U.S. PATENT DOCUMENTS

| | | | |
|---|---|---|---|
| 923,854 | 6/1909 | Kenyon | 43/42.02 |
| 2,234,077 | 3/1941 | Hayley | 43/42.02 |
| 2,544,178 | 3/1951 | Pfahler | 43/42.3 |
| 2,763,085 | 9/1956 | Caillier | 43/42.02 |
| 3,898,757 | 8/1975 | Gentert | 43/42.5 |

*Primary Examiner*—Nicholas P. Godici
*Attorney, Agent, or Firm*—Daniel Jay Tick

[57] ABSTRACT

A fish lure has a top plate-like strip mounted on a closed loop and extending diametrically across the loop perpendicularly to a fishing line affixed to the top of the loop. A pair of bottom plate-like strips are mounted on the loop in the bottom part thereof and extend at an angle with each other. Each of the bottom strips is mounted on the loop at one end in angular relation with the top strip. Each of the bottom strips is essentially planar and curves slightly at its farther end from the loop. Fishing hooks are affixed to the distant ends of the bottom strips.

2 Claims, 4 Drawing Figures

FISH LURE

BACKGROUND OF THE INVENTION

The present invention relates to a fish lure.

Fishing lures similar to that disclosed herein are described in U.S. Pat. Nos. 2,234,077; 2,724,205; 2,763,085; 2,770,063; 3,939,912 and 4,033,063.

Objects of the invention are to provide a fish lure of simple structure, which is inexpensive in manufacture, used with facility and convenience, and functions efficiently, effectively and reliably to provide a soft type kicking action which attracts all game fish when it is jiggled straight up and down in the water. The fish lure of the invention is especially suitable for ice fishing or for fishing vertically from the side of a boat, and functions by simply permitting the hook to sink to a desired depth in the water and then jerking it up and permitting it to return to rest again. When the lure is jerked up, the strips thereof come together, and when it is permitted to sink again, the strips thereof kick out. The fish lure of the invention may be baited with any desired type of bait, and the bait does not restrict its kicking action.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
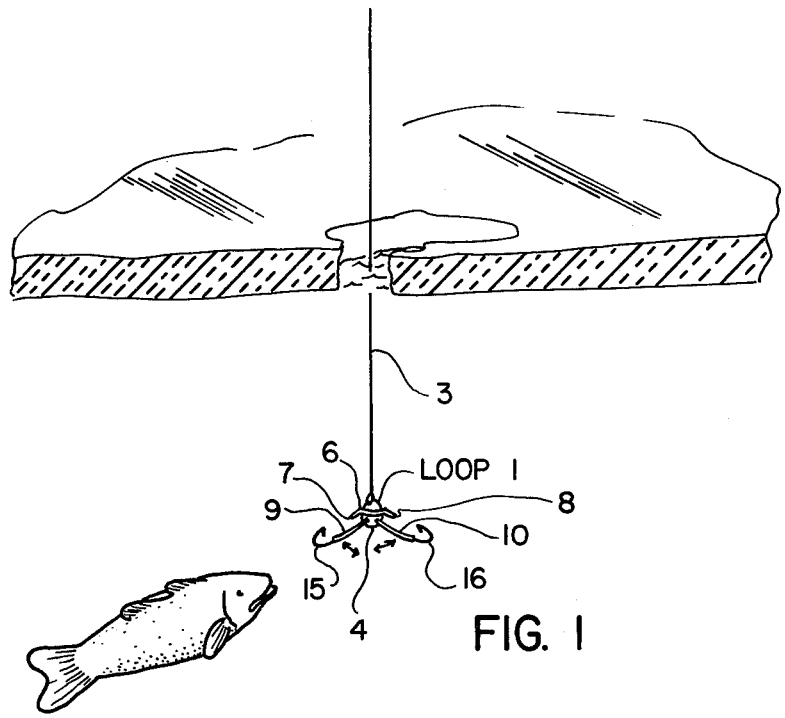
FIG. 1 is a view of an embodiment of the fish lure of the invention in use in ice fishing.
Figure 3:
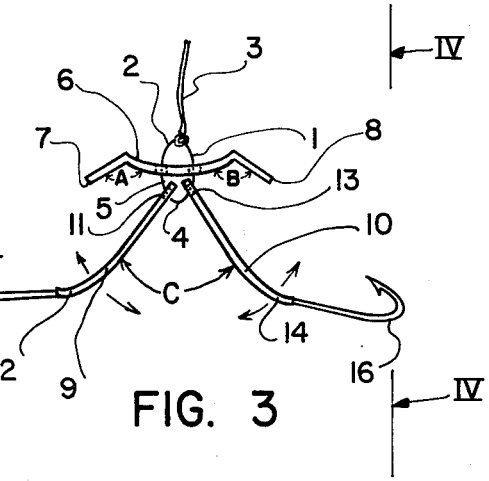
FIG. 3 is a view, taken along the lines III—III, of FIG. 2.
Figure 4:
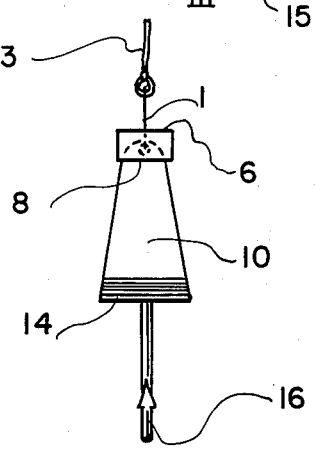
FIG. 4 is a view, taken along the lines IV—IV, of FIG. 3.

The fish lure of the invention comprises a closed loop 1 having a top part 2 (FIG. 3) affixed to a fishing line 3 (FIGS. 1, 3 and 4). The closed loop 1 has a bottom part 4 (FIGS. 1 and 3) in spaced opposite relation with its top part 2, and an intermediate part 5 (FIG. 3) between said top and bottom parts.

A top plate-like strip 6 is mounted on the loop 1 in the intermediate part 5 thereof and extends substantially diametrically across the loop, substantially perpendicularly to the fishing line 3. The top strip 6 has spaced opposite ends 7 and 8 (FIGS. 1 to 3) extending beyond, and spaced from, the loop 1 on diametrically opposite sides thereof. The top strip 6 is essentially planar, and is bent in the areas of its opposite ends 7 and 8 to form obtuse angles A and B (FIG. 3) opening away from the fishing line 3. The angles A and B are equal to each other and are substantially 100°. The top strip 6 is substantially rectangular in configuration, as shown in FIG. 2.

A pair of bottom plate-like strips 9 and 10 are mounted on the loop 1 in the bottom part 4 thereof, as shown in FIGS. 3 and 4, and extend at an angle C with each other (FIG. 3). The angle C varies with the kicking action of the lure, since each of the bottom strips moves up and down in the directions indicated by arrows in FIGS. 1 and 3. The bottom strips 9 and 10 have spaced opposite first and second ends 11 and 12, and 13 and 14, respectively (FIG. 3).

The bottom strips 9 and 10 are mounted on the loop 1 at their second ends 11 and 13, respectively, in angular relation with the top strip 6, as shown in FIGS. 1 and 3. Each of the bottom strips 9 and 10 is essentially planar and curves slightly at its second end, as shown in FIGS. 1 and 3. Fish hooks 15 and 16 are affixed to the second ends 12 and 14, respectively, of the bottom strips 9 and 10, respectively.

Figure 2:
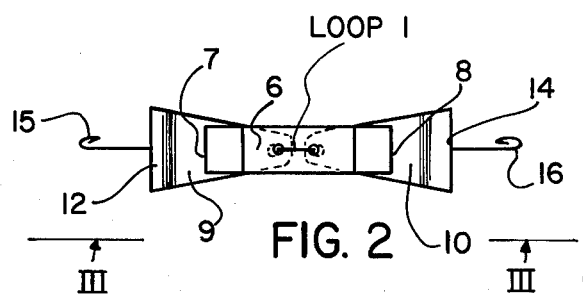
FIG. 2 is a top plan view, on an enlarged scale, of the embodiment of FIG. 1.

Each of the bottom strips 9 and 10 flares outward from a minimum width at its first end 11 and 13, respectively, to a maximum width at its second end 12 and 14, respectively, as shown in FIG. 2.

As the line 3 is raised and lowered in the water, the bottom strips 9 and 10 move clockwise and counterclockwise on the loop 1, as indicated by the arrows in FIGS. 1 and 3.

While the invention has been described by means of a specific example and in a specific embodiment, I do not wish to be limited thereto, for obvious modifications will occur to those skilled in the art without departing from the spirit and scope of the invention.

I claim:

1. A fish lure, comprising
    a closed loop having a top part affixed to a fishing line, a spaced opposite bottom part and an intermediate part between the top and bottom parts;
    a top plate-like strip mounted on the loop in the intermediate part thereof and extending substantially diametrically across the loop substantially perpendicularly to the line, said top strip having spaced opposite ends extending beyond and spaced from the loop on diametrically opposite sides thereof, said top strip being essentially planar and bent in the areas of its opposite ends to form obtuse angles opening away from said line; and
    a pair of bottom plate-like strips mounted on the loop in the bottom part thereof and extending at an angle with each other, each of said bottom strips having spaced opposite first and second ends and being mounted on the loop at its first end in angular relation with said top strip, each of said bottom strips being essentially planar and curving slightly at its second end and affixed at its second end to a fish hook.

2. A fish lure as claimed in claim 1, wherein said top strip is substantially rectangular in configuration and each of said bottom strips flares outward from a minimum width at its first end to a maximum width at its second end, said bottom strips moving clockwise and counterclockwise on said loop as the line is raised and lowered in water.